Aug. 12, 1969  J. V. S. DAHLGREN  3,461,415
OVEN CONTROL APPARATUS

Filed July 27, 1967  3 Sheets-Sheet 1

INVENTOR.
JOHN V. S. DAHLGREN
BY
Yount, Raney, Flynn & Tarolli
ATTORNEYS

Aug. 12, 1969

J. V. S. DAHLGREN 3,461,415

OVEN CONTROL APPARATUS

Filed July 27, 1967

INVENTOR.
JOHN V. S. DAHLGREN
BY
Yount, Raney, Flynn & Tarolli
ATTORNEYS

Aug. 12, 1969   J. V. S. DAHLGREN   3,461,415
OVEN CONTROL APPARATUS
Filed July 27, 1967   3 Sheets-Sheet 3
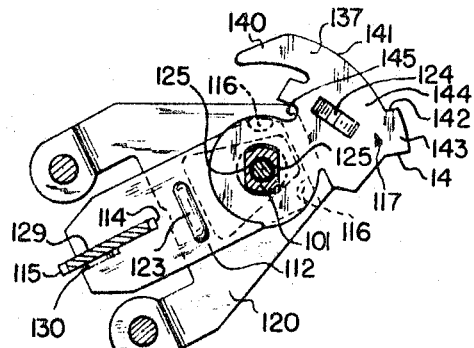
FIG.9A
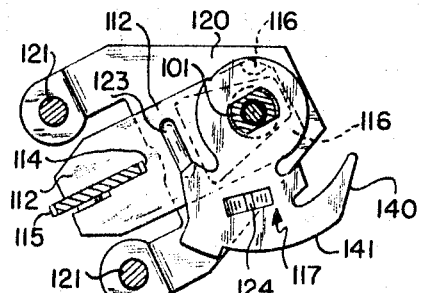
FIG.9B
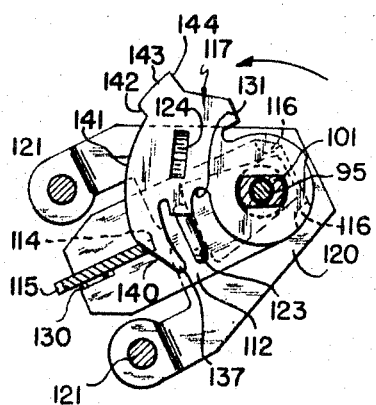
FIG.9C
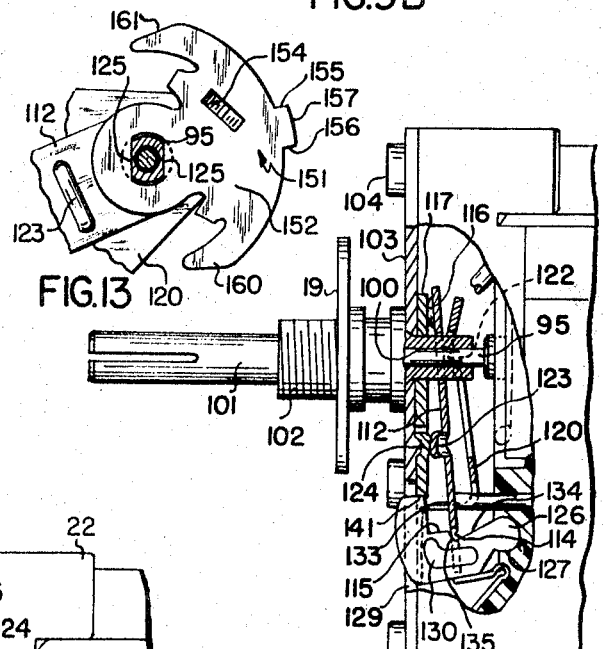
FIG.13
FIG.11
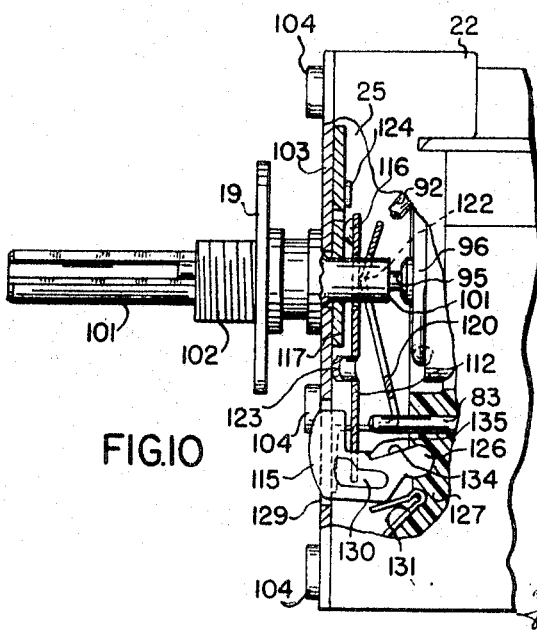
FIG.10
INVENTOR.
JOHN V. S. DAHLGREN
BY
Yount, Raney, Flynn & Tarolli
ATTORNEYS р
United States Patent Office 3,461,415
Patented Aug. 12, 1969

3,461,415
OVEN CONTROL APPARATUS
John V. S. Dahlgren, Atlantic Highlands, N.J., assignor to Ranco Incorporated, Columbus, Ohio, a corporation of Ohio
Filed July 27, 1967, Ser. No. 656,506
Int. Cl. H01h 37/36
U.S. Cl. 337—310      3 Claims

ABSTRACT OF THE DISCLOSURE

In FIGS. 1–11 a control apparatus for the bake and broil elements of an oven is shown in which switching means 26, 45, 56 and 71 control apposite sides of bake element 17 and broil element 16, the switches 26, 45 being operated sequentially by a thermally responsive element 90, 93 and the temperatures at which the switches operate being adjustable by a knob 21. When the knob is set on the broil position, the switch 56 for the bake element is latched open by latch 115, lever 112, and is so held open during rotation of the knob through the adjusting range and is released to reclose only after the knob has been returned to the off position. In the embodiment shown in FIGS. 12, 13 the knob 150 is movable through two ranges of temperature selections, X, Y, and the switch 56 is held open to break the circuit to the bake element during the time the knob is in the range Y which regulates the maximum broil temperatures in the oven.

The present invention relates to control apparatus for regulating ovens and more particularly to apparatus for controlling broiling and baking operations in electrically controlled cooking ovens.

It is common practice to provide electric cooking ovens in which an electric broil heating element is located in the top portion of each oven and an electric baking heating element is located in the bottom portion of the oven. Heretofore, control apparatus has been provided by which the energization of the heating elements were selectably controlled by manipulation of a control knob from an off position and through a temperature range to provide desired baking temperatures by heat from the baking element only, and to provide a broiling condition by energization of the broiling element only. When the control knob was set in the broil position the broil element switch was actuated by the thermally responsive element to open the broil circuit only when the temperature of the oven reached the maximum temperature setting of the control and the maximum temperature produced in the oven could not be regulated merely by setting the control knob.

The present invention provides an improved control apparatus of the type mentioned characterized by the provision of means for latching the bake circuit control switch in the open position when the control knob is moved to the broil position and which latch is effective to hold the bake element switch open until the knob is returned to its off position or a position approaching the off position, whereby after the knob has been moved to establish broil conditions, the knob can then be reset to a temperature in the temperature control range of the adjusting knob, so that the maximum temperature produced in the oven during broiling operations may be set at any desired degree lower than the maximum temperature setting.

The invention further contemplates the provision of an improved control apparatus of the character mentioned which is relatively inexpensive to manufacture and which is reliable and accurate in its operations.

Other objects and advantages of the invention will be apparent from the following description of preferred forms thereof, reference being made to the accompanying drawings wherein:

FIGS. 9A, 9B and 9C are fragmentary views of the control apparatus, taken substantially along line 9—9 of FIG. 3 and showing certain parts in different positions;

FIGS. 10 and 11 are fragmentary views of the control apparatus partly in section and showing certain parts in different positions;

FIG. 13 is a fragmentary view similar to FIG. 9A showing a modified form of cam plate employed in the apparatus shown in FIG. 12.

Figure 1:
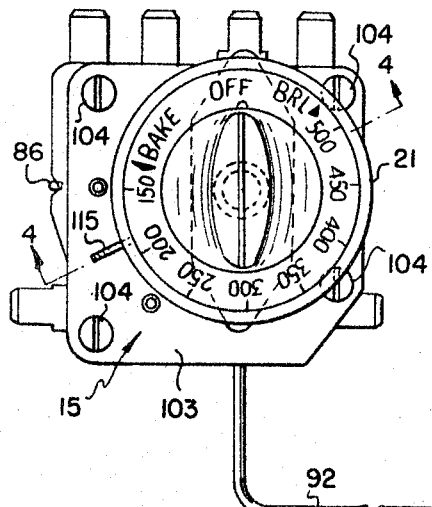
FIG. 1 is a front elevational view of a control apparatus embodying the invention and adapted to control the broil and bake heating elements of an electric oven.

Referring to the drawings, a control apparatus 15 is shown which is adapted to control the electric heating elements 16 and 17 of a conventional electric cooking stove oven indicated at 20. It is to be understood, however, that the control apparatus could as well be employed to control electrically operated valves of a fuel gas oven having similar broil and bake burners. The heating element 16 is located at the upper section of the oven and is adapted to broil foods placed in a rack, not shown, therebeneath, and is hereinafter referred to as the "broil element." The element 17 is located in the bottom section of the oven and is adapted to maintain temperatures in the oven suitable for baking and is hereinafter referred to as the "bake element." The control apparatus 15 is adapted to be supported on a stove panel, not shown, by a mounting plate 19 secured to a bushing described hereinafter so that the user of the stove can conveniently control the heating elements and the temperature produced in the oven by rotation of a knob or dial 21 on the control apparatus.

The knob 21 has a range of rotational movement between off and broil positions with oven temperature indicia intermediate the two positions which cooperate with a mark on the panel to indicate the position of the knob and the temperatures selected. As viewed in FIG. 1 of the drawings, the knob 21 is rotated clockwise from its off position to energize the heating elements. When the knob 21 is initially set for a desired oven temperature and the oven is at or about room temperatures, both the broil and bake element circuits are energized. As the temperature in the oven approaches within approximately 20° F. of the temperature indicated by the setting of the knob 21, for example, the broil circuit is opened and the oven is heated by the bake element 17 only. When the temperature in the oven reaches the setting indicated by the knob 21 the circuit for the bake element 17 is opened. Thereafter the bake element 17 is cycled on and off to maintain substantially the temperature selected without re-energization of the broil circuit. When it is desired to effect broiling, the knob 21 is rotated clockwise through the maximum temperature setting and to the broil position whereupon the circuit of the bake element 17 is opened and the broil element 16 is energized until such time as the oven tempearture reaches approximately that corresponding to the upper limit of the knob setting. According to the present invention the knob 21 may then be turned back from the broil setting, which is also the highest temperature setting, to a lower temperature setting within the bake temperature range without causing reclosing of the circuit for the bake element 17, and at which point the broil element will then be limited in energization to prevent the oven temperatures from exceeding the temperature setting. The normal controlling of the bake element is restored by returning the knob 21 to the off position, after which the knob may be manipulated as described to provide bake operations.

Referring more particularly to the details of the control apparatus 15, the apparatus comprises a body 22 which is preferably formed of a molded dialectric material having the shape of an open ended rectangular box-like structure with an intermediate transverse wall 23. The body 22 thus includes two cavities 24, 25 in which broil and bake element control switch structures and their actuating mechanisms are located, respectively, and are described hereinafter.

Figure 5:
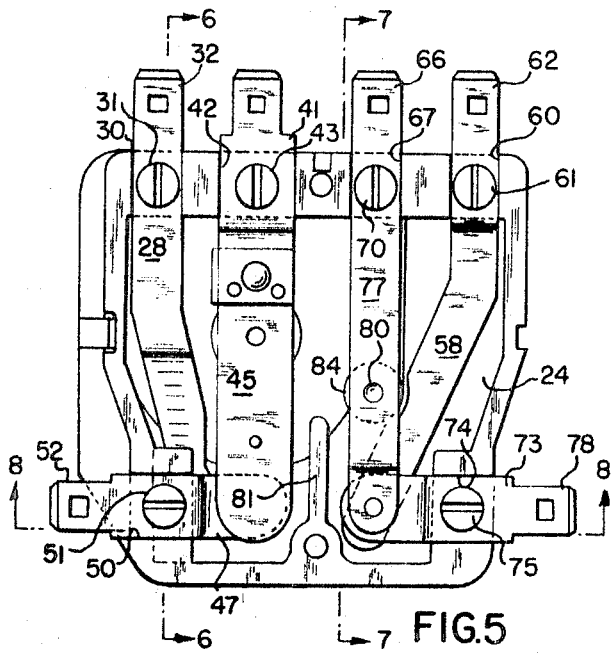
FIG. 5 is an elevational view of the control apparatus taken substantially along line 5—5 of FIG. 3.
Figure 6:
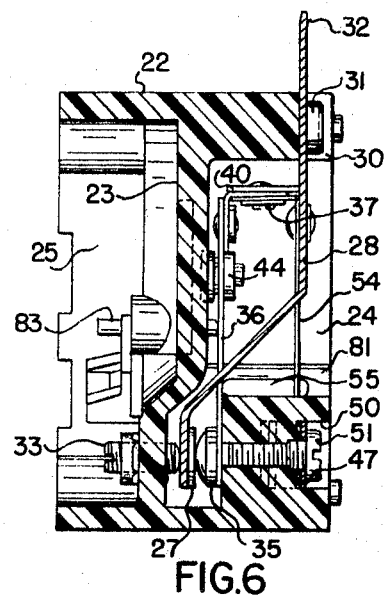
FIG. 6 is a sectional view of the control apparatus taken substantially along line 6—6 of FIG. 5.
Figure 8:
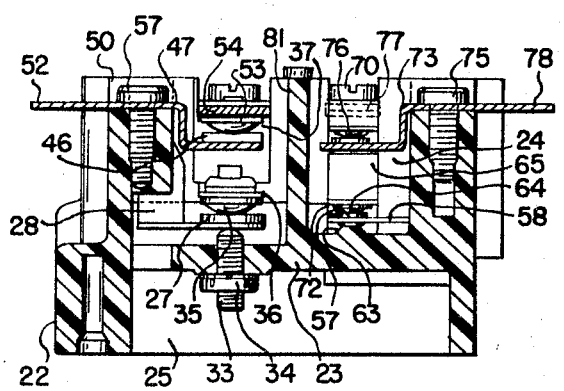
FIG. 8 is a sectional view taken substantially along line 8—8 of FIG. 5.

A broil element control switch 26 is located in the cavity 24 and comprises a fixed contact 27 which is attached to one end of a conductor strip 28, the opposite end section of which projects through a notch 30 formed in the end edge of the cavity 24, and which is secured in the notch by a screw 31. The portion 32 of the strip 28 extending beyond the screw 31, as viewed in FIG. 5, is shaped to provide a convenient slip-type connection with a coating connector, not shown, attached to a wire leading to one side of the broil element 16. The strip 28 is resilient and is inherently urged against one end of a screw 33 which is threaded through an opening in the wall 23, as seen in FIG. 8. The contact 27 is adapted to be engaged by a contact 35 carried on one end of a flexible contact arm 36 formed of a suitable resilient conductor strip. The arm 36 is riveted at one end to one leg of a U-shaped flat spring assembly 37, which assembly is riveted to a turned portion 40 of a terminal bar 41 which is located in a notch 42 in the end edge of the cavity 24 and which is secured in the notch by a screw 43. The arm of the spring assembly to which the contact arm 36 is attached biases the contact arm to close contact 35 on contact 27. The arm 36 is adapted to be moved from the contact 27 by a power element, described in detail hereinafter, and which has a movable part which engages an insulator abutment member 44 attched to the arm.

Figure 2:
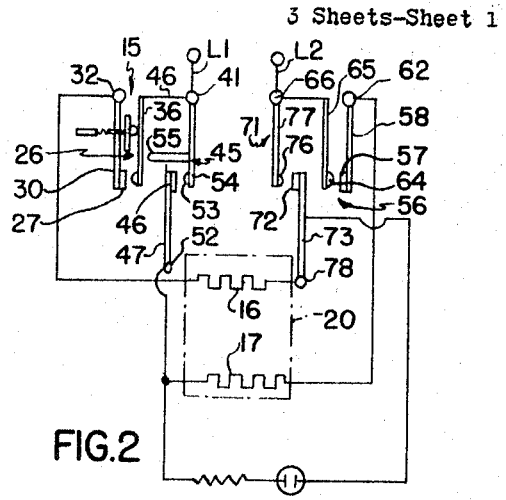
FIG. 2 is a schematic diagram showing the control apparatus connected in an electric oven circuit.

The terminal bar 41 projects from the side of the body 22 along side the portion 32 of the conductor 30 and provides a similar terminal connection arrangement. As seen in FIG. 2, the terminal 32 is connected to one end of the broil element 16 and the terminal 41 is connected to a power supply line L1 of a suitable power source, such as 220 v. AC. Switch 26 therefore controls energization of the broil element 16.

A second switch structure 45, adapted to control the bake element 17, is provided in the cavity 24 adjacent the switch structure 26 and is adapted to be actuated by movement of the contact arm 36 after the contacts 27, 36 have separated. The switch structure 45 is comprised of a contact 46 which is attached to one end of a Z-shaped conductor bar 47, a portion of which is nested in a notch 50 formed in the end edge of the cavity 24 and which is rigidly secured in the notch by a screw 51. An end portion 52 of the bar 47 projects beyond the screw 51 and alongside the terminal 42, and forms a terminal like the terminals 32, 41. A movable contact member 53 is attached to one end of a flat spring blade or contact arm 54, the other end of which is riveted to the other arm of the U-shaped spring assembly 37 so that the contact arm extends generally parallel to the contact arm 36. The blade 54 is inherently biased to move the cantact 53 into contact with fixed contact 46. A pin 55 is attached at one end to the contact arm 54 and is adapted to be engaged by the contact arm 36 to cause the arm 54 to be moved from contact 46 after arm 36 separates contact 35 from contact 27. The end portion 52 of the conductor bar 47 is adapted to be connected with one end of the bake element 17, as seen in FIG. 2 and the switch 45 thus controls energization of the bake elements 17 in the side of the circuit for the element connected with line L1.

A third switch mechanism 56, adapted to control the bake element 17 at the other side thereof, is provided in the cavity 24 and comprises a relatively fixed contact 57 attached to one end of a conductor bar 58. A section of the bar 58 is Z-shaped with one end portion thereof nesting in a notch 60 formed in the end edge of the cavity 24 and which portion is rigidly secured in the notch by a screw 61. The end portion 52 of the bar 58 forms a terminal similar to terminals 32, 41 and 52, and is connected to the bake element. A major portion of the bar 58 extends parallel to the partition wall 23 and the resiliency thereof urges it against a boss 63 formed on the wall. The contact 57 is adapted to be engaged by a contact 64 which is attached to one end of a flat spring type contact arm 65 which is inherently urged in a direction to close contact 64 on contact 57. The opposite end of the contact arm 65 is suitably attached to a blade type terminal member 66 which is nested in a notch 67 in an edge of the cavity 24 and is secured therein by a screw 70. In the form shown, the end portion of the arm 65 is nested in the notch 67 beneath the terminal member 66. The terminal 66 is adapted to be connected with power line L2, and it will be seen that switch 56 controls the side of the bake element 17 connected with line L2.

A switch mechanism 71 is disposed adjacent the switch mechanism 56 and it includes a fixed contact 72 attached to a Z-shaped terminal bar 73 which nests in a notch 74 in the body 22 and is secured in the notch by a screw 75. One end 78 of the bar 73 projects beyond the side of the body 22 and provides a blade type connector for slidingly attaching the terminal bar to the other side of the broil element 16, which includes a wire and member to receive the terminal. The contact 72 is adapted to be engaged by a contact 76 carried on an end of a flat spring type of contact arm 77, the opposite end portion of which overlies and is attached to the terminal blade 66. The resiliency of the arm 77 normally urges it in a direction to engage the contact 76 with contact 72 and a major portion of the arm extends adjacent and parallel to the arm 65. Preferably, the arm 77 has a dimple 80 therein which forms a spacer between the arm 65, 77. It will be appreciated that switch 71 controls the broil element 16 on the side of the element connected with line L2.

Electrical isolation of the switches 26, 45 from switches 56, 71 is provided by a wall or barrier 81 formed in the cavity 24 and extending between the contact carrying ends of the arms 36, 46, 55, 65 and 77.

Figure 7:
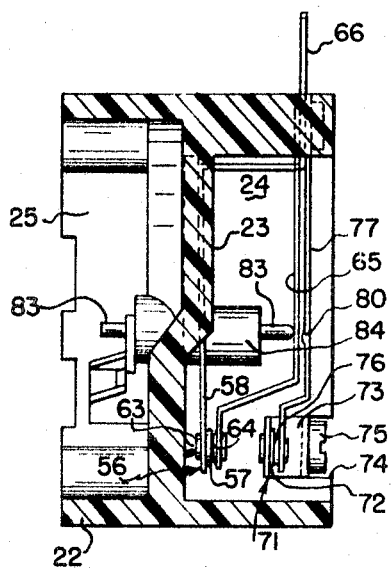
FIG. 7 is a sectional view of the control apparatus taken substantially along line 7—7 of FIG. 5.

The arms 65, 77 of the switches 56, 71 are adapted to be moved to the right, as viewed in FIG. 7, by a pin-like plunger 83 which is of dielectric material and slides longitudinally in a bore through a cylindrical formation 84 formed in the body 22. One end of the plunger 83 extends into the cavity 25 and is actuated longitudinally by an operating lever described hereinafter to open the switches 56, 71 successively by the positioning of the knob 21, in a manner described more fully hereinafter.

The opened side of the cavity 24 is closed by a suitable insulating plate 85 which is retained to the body 22 by a bail shaped wire spring 86 having its ends turned inwardly and engaged in openings in the body.

The switch arm 36 is adapted to be actuated by a conventional condition responsive power element 90 which comprises an expandable wafer-like assembly 91 having a capillary tube 92 and bulb 93 hermetically connected therewith and all containing a suitable thermally responsive liquid. The bulb 93 is adapted to be located in the oven to respond to the temperature therein and the wafer assembly 91 expands and contracts by changes in volume of the liquid therein as determined by increases and decreases, respectively, of the temperature at the bulb, as is well known in the art.

The assembly 91 is formed of two disc-like corrugated flexible metal members joined together about their edges and one of the members has a stem 95 attached thereto coaxial therewith and the stem includes an enlarged base 96 which is welded to the disc member. The assembly 91 is supported by the stem 95 and the other flexible disc of the assembly has a base or post 97 thereon which engages the abutment member 44 on the arm 36 so that the arm moves to and fro according to the expansion and contraction of the element 91.

Figure 3:
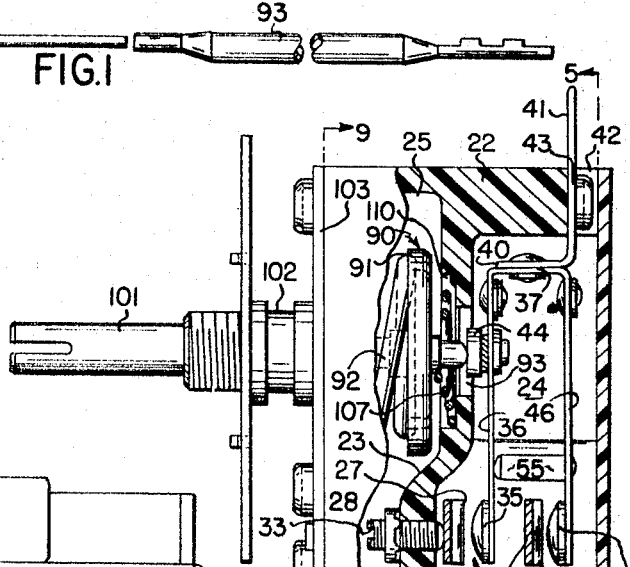
FIG. 3 is a view of the control apparatus shown in FIG. 1 showing certain parts thereof broken away and in section.

The stem 95 is slidingly received in a bore 100 in the inner end of a rotatable adjusting shaft 101 which is threaded into an internally threaded bushing 102. The bushing 102 is suitably attached to a cover plate 103 which is secured by screws 104 to the end of the body 22 so as to close the cavity 25 and to support the adjusting shaft 101. The left-hand section of the shaft 101, as viewed in FIGS. 3, 10, and 11, for example, is hollow and split to frictionally engage the socket walls of the knob 21 and forms a flat or D-shape cross sectional configuration of the shaft to provide a positive torque connection between the knob and shaft by engaging with corresponding shaped inner walls of the socket in the knob. By rotating the knob 21, the shaft 101 is moved longitudinally in the bushing 102 and positions the assembly 91 closer to or more removed from the contact bar 36 so that the switch 26 is operated at higher or lower temperatures at the bulb 93.

The end of the stem 95 inside the bore 100 is engaged by a ball bearing 105 in the bore and which is in turn engaged by the end of a screw 106 threaded into the bore. A coil spring 107 disposed in a circular recess 110 in the wall 23 continuously urges the assembly 91 to the left and maintains the ball 105 in engagement with the screw 106. The screw 106 has a slotted end for receiving a tool by which the screw may be rotated and position the ball 105 longitudinally in the bore to correctly locate the stem 95 in the bore to calibrate the apparatus, as is well understood in the art.

To permit shifting of the assembly 91 without injury to the capillary tube 92, the tube is coiled in a generally flat spiral about the stem 95 and the right hand end of the shaft 101. To facilitate this arrangement one end of the tube 92 is brazed or welded in an opening in the side of the enlargement 96, which opening is in communication with the interior of the assembly 91. The spiral form of the tube 92 permits flexing thereof without undue stressing.

The plunger 83 is moved to open both switches 56, 71 by rotation of the knob 21 to the off position, and when the knob is moved from the off position, the plunger may be moved by the switches to reclose and remain closed during adjustment of the knob throughout the baking temperature range. According to the invention, when the knob 21 is moved to the broil position, the plunger 83 is moved longitudinally to open the switch 71 only and the plunger is retained in this switch opening position during movement of the knob in either direction and throughout the major portion of its adjusting temperature range. Thus, the knob 21 may be set to limit the temperature in the oven during broiling operations. After the knob 21 has been turned to the off position, the switch 71 will be closed during a subsequent bake operation.

The mechanism of actuating the plunger 83 in the manner described comprises a sheet metal operating lever 112 which has an opening adjacent one end and through which the inner end of the shaft 101 extends. The lever 112 has a slot 114 at the opposite end which receives a plate-like latch member 115. The first mentioned end of the lever 112 has two dimples 116 which form fulcrums about which the lever pivots and they ride continuously on the outer surface of a flat cam plate 117 rotatably connected with the shaft 101 so as to be rotated by the knob 21. The pivoted end of the lever 112 is biased against the cam plate 117 by an A-shaped flat spring 120, the legs of which straddle the lever 112 and the outer ends of which are riveted to the plate 103 by rivets 121. The inner end of the shaft 101 extends through the opening at the apex of the spring 120 and the two converging legs of the spring at opposite sides of the shaft are curved to form abutments 122 which engage the operating lever 112 so that the spring urges the level to the cam plate 117 and clockwise about the pivots 116. The edges of the slot 114 engage opposite sides of the latch member 115 to prevent rotation of the lever by the cam plate.

The lever 112 has a cam follower 123 struck therefrom which is adapted to ride onto the cam plate 117 when a section of the plate is rotated into registration therewith. When the cam plate 117 is moved into registration with the follower 123, lever 112 is moved counterclockwise thereby to a first operative position in which it moves the plunger 83 to open the switch 56 only. The cam plate 117 includes a riser 124 which engages the follower 123 when the knob 21 is in the off position to cause the lever 112 to be moved to a second position to the right, as seen in FIG. 11, and move the plunger 83 sufficiently to open both switches 56 and 71.

The cam plate 117 is adapted to turn with the shaft 101 and to be held to the plate 103 by the force of the spring 120 while the shaft moves longitudinally as it is threaded in the bushing 102. This shifting movement is effected by forming flats 125 on opposite sides of the inner end of the adjusting shaft 101 and providing a like shaped opening through the cam plate 117 with sufficient clearance with the shaft to permit sliding of the shaft relative to the cam. The tension force of the spring 120 acting against the lever 112 applies pressure to maintain the cam plate 117 against the cover plate 103 although the adjusting shaft 101 moves longitudinally as the shaft is rotated.

Figure 4:
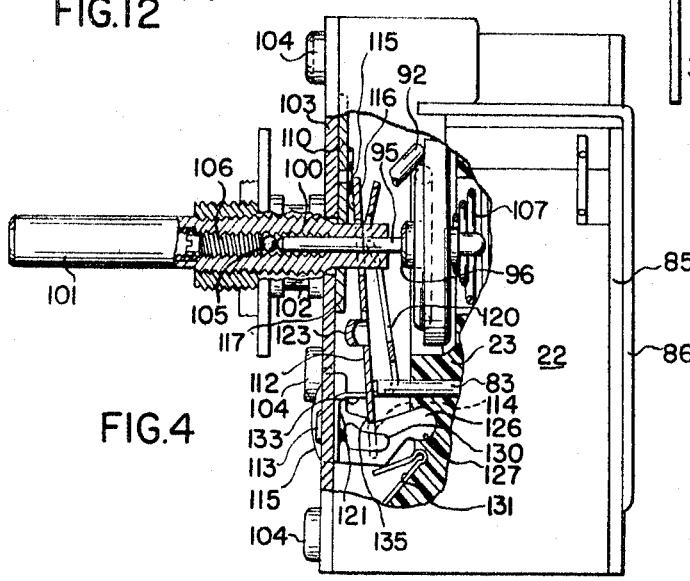
FIG. 4 is a view, partly in section, of the control apparatus, the view being taken substantially along line 4—4 of FIG. 1.

As is explained more fully hereinafter, the cam 117 is shaped so that it is out of registration with the follower 123 during the time the knob 21 is in the bake temperature range and is moved into registration with the follower when the knob is set for broil. In this setting of the knob 21, the latch member 115 is effective to retain or latch the operating lever 112 in position into which it was shifted by the cam 117 and the lever will remain latched in the switch open position although the cam is removed from engagement therewith when the knob 21 is turned from broil to any position in the indicated temperature range. This condition is shown in FIG. 4. Thus, if it is desired to limit the temperature of the oven during broiling, the knob 21 may be set for the maximum temperature desired at any point in the adjusting range and the bake element 17 will remain de-energized by reason of the open oven switch 56 and the broil element 16 will be cycled by the power element 90.

To effect the latching of the lever 112 as just described, the latch member 115 is formed of a generally flat member having a rounded end 126 which nests in a rounded recess 127 formed in the wall 23, and the opposite end of the latch members extends through a slot 129 in the cover 103. The sides of the slot 129 support the latch member 115 in position and limit its movement about the pivot formed by the end portion 126. A boss 130 is coined on the side of the latch member 115 which increases the thickness of the latch member in the coined area beyond the width of the slot 129 so that the latch member cannot move outwardly through the slot. The latch member 115 is urged about its pivot by a U-shaped spring 131, one leg of which engages one edge of the latch member and the opposite leg of which is nested in a slot formed in the wall of the body 22. The upper edge of the latch member 115 which is received in the slot 114 in the operating lever 112 has two surfaces 133, 134 separated by a step 135. When the operating lever 112 is in the position shown in FIG. 10, i.e., with the cam 117 removed therefrom, the edge 133 of the latch member engages the end edge of the slot 114. When the operating lever 112 is shifted to the right by the cam plate 117, the end edge of the slot 114 therein is shifted to register with the edge portion 134 and the spring 131 shifts the latch member 115 to move the edge 134 to the end of the slot which positions the step 135 to one side of the lever adjacent to the end of the slot thereby latching the lever in position to hold switch 71 open.

The latch member 115 is adapted to be shifted downwardly and move the step 135 into the slot 114 of the operating lever 112 and release the lever when the knob 21 is rotated beyond the lower end of the temperature scale and toward the off position. This shifting is effected by a wedge shaped arm 137 formed on the cam plate and having a cam edge 140 which engages and cams the member 115 downwardly as seen in FIGS. 9C and 11. The latch member 115 is held in its lever release position by a high section 141 of the cam plate as the knob is rotated to the off position.

When the knob 21 is moved to the off position, the riser 124 of the cam plate 117 engages the follower 123 on the lever 112 and the lever is shifted thereby further to the right to move the plunger 83 to cause contact arm 65 of switch 56 to bump contact arm 77 of switch 71 and separate contacts 72, 76 of switch 71. Thus, both switches 56 and 71 are opened to break the broil and bake element circuits on the side normally connected with line L2.

When the knob 21 is rotated from the off position, the cam riser 124 initially moves from the follower 123 and the lever 112 moves to perimt switch 71 to close. Upon further rotation of the knob 21, the follower 123 drops from the cam plate 117 to the cover plate 103 which enables the operating lever 112 to shift and effect closing of switch 56. The latch member 115 is then released by further rotation of the knob 21 by reason of the cam surface 140 leaving the latch member and the latch member will then be in the position shown in FIG. 10 set for latching action with respect to the lever 112.

The limit of rotation of the knob 21 counterclockwise to the off position is determined by an abutment 142, formed by one edge of a lug 143 projecting from the cam plate 117 so as to strike one side of the latch plate 115. The rotation of the knob 21 clockwise is limited by the edge 144 of the lug 143 engaging the side of the latch member 115.

It will be appreciated that when the control knob 21 is in the off position, the temperature setting will be below normal ambient and both switches 26, 45 will be held open by the power element 90. Likewise, plunger 83 will be in position to open both switches 56, 71 and therefore both sides of the circuits for heating elements 16, 17 will be open. When the knob 21 is then set for a bake temperature, both switches 56, 71 are closed by release of the plunger 83 by the lever 112, and because the oven temperature will be below the temperature setting, assuming a cold start of the bake operation, both switches 26, 45 will be closed and both the broil and bake elements 16, 17 will be energized to quickly heat the oven. When the oven temperature approaches to within about 20° F. of the temperature setting, the broil element control switch 26 is opened by expansion of the element 90 thereby terminating energization of the broil element. When the tempera-ture in the oven corresponds to the setting of the knob 21, the switch 45 is opened by the power element 90 to deenergize the bake element and thereafter the switch 45 is opened and closed by the power element to maintain the desired temperature.

If broiling is desired, the knob 21 is set in the broil position which latches the switch 56 open, thereby breaking the bake element circuit and the broil element will then be controlled by switch 26 according to the oven temperature and the temperature setting of the knob 21. The temperature setting may be at any point in the range of settings and the broil element 16 will be cycled on and off, should the temperature of the oven reach the temperature setting. The bake element 17 will remain deenergized by reason of switch 56 being latched open by the interaction of the latch member 115 with the switch operating lever 112. When the knob 21 is returned to its off position, the latch member 115 will be moved to unlatch the operating lever 112 and which, however, is retained in the switch opening position by the follower 123 engaging the cam plate 117, as has been described hereinbefore.

Figure 12:
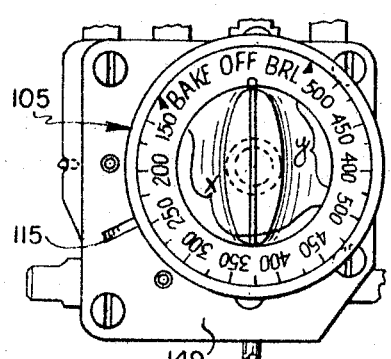
FIG. 12 is a front elevational view of a second form of control apparatus embodying the invention.

The invention further provides a control apparatus for cook stoves of the type described in which the adjusting knob may have two temperature range scales, one for baking in which the bake element is cycled to maintain bake temperatures and the other range being in a broil range in which the bake element is deenergized by opening of the switch 56 while the broil element is controlled through the cycling of the switch 26. A control apparatus of this character is shown at 149 in FIG. 12, and all parts but the knob 150 and a cam plate 151, substituted for the cam plate 117, are like the parts and assembly of the control apparatus 15.

To provide for the double temperature range mentioned, a cam plate 151, shown in FIG. 13, and the adjusting knob 150 are incorporated in the control apparatus 149, the construction of which apparatus is otherwise like the control apparatus 15. The cam 151 is formed so that it does not engage the follower 123 of the switch operating lever 112 except during the time the knob 150 is in the broil temperature adjusting zone or the off position. When the knob 150 is in the broil zone, the portion 152 of the plate 151 moves between the follower 123 and the plate 103 to shift the lever 112 to a position in which the bake element control switch 56 is opened. When the knob 150 is rotated to the off position, a riser 154 struck therefrom engages the follower 123 of the lever 112 and shifts the lever to open both switches 56 and 71.

In the control apparatus 149, the latch member 115 is moved to the unlatching position when the knob 150 is rotated to the off position and into the broil temperature adjusting range by wing shaped cam portions 160, 161 which engage the edge of the latch member and move the member similarly to the manner in which the cam surfaces 140, 141 engage the latch member of the apparatus 15. In this form of apparatus, the latch member 115 is not operative to latch the lever 112, but merely serves as an abutment to limit rotation of the knob 150 by reason of the edges 155, 156 of a lug 157 on the cam plate 151 engaging opposite sides of the latch member when the knob is rotated in opposite directions.

The broil range of adjustment Y is marked in increments of 25° F., the lowest marking being 375°, and is spaced from the highest (500°) temperature marking on the bake range X by a space corresponding to about 35° F. Thus, a temperature setting of 400° in the broil range, for example, will adjust the position of the element 90 to correspond to a bake position of about 560°. Accordingly, to provide for accurate operation of the broil switch 26 by the element 90 when the knob 150 is in the broil range Y, the screw 33 is adjusted so that switch arm 36 actuates switch arm 46 of the bake element control switch 45 to open the bake element control switch 45 at 160° F. higher than the temperature at which the broil control switch 26 is opened.

It will be seen that the invention provides a relatively inexpensive, conveniently constructed and calibrated control apparatus for controlling the heating elements of cook stoves and having an adjusting member which can be made effective to limit the temperature in the oven during both the bake and broil operations, and which apparatus may be readily altered by the substitutions of one cam plate and an adjusting knob to provide either a single temperature control range in which the adjusting member operates or a dual temperature range, one range for baking temperature control and the other range for broiling. Thus, two different forms of control apparatuses can be manufactured by use of common parts except for the dial adjusting member and its bushing and the cam plate.

It will be understood that although but two forms of the invention have been shown, other forms, modifications and adaptations thereof may be made all falling within the scope of the claims which follow.

What is claimed is:

1. A control apparatus comprising: a body having two cavities separated by an intermediate transverse wall and open to opposite sides of said body; a first pair of electric switches supported in one of said cavities and comprising first and second spaced relatively fixed contact members mounted on said body, first and second spring blade type contact arms fixedly supported at one end on said body and extending generally parallel and inherently biased to engage said first and second contact members respectively, an abutment between said contact arms adapted to transfer movement of said first contact arm to said second contact arm as said first arm moves away from said first contact member whereby said switches are opened sequentially; means to adjustably position said first contact member relative to said first contact arm; a second pair of electric switches in said one cavity comprising third and fourth relatively fixed contact members mounted on said body, third and fourth spring blade contact arms supported at one end on said body and inherently biased to engage said third and fourth contact members respectively, said third arm adapted to move said fourth arm from said fourth contact member by movement of said third arm away from said third contact member; a cover plate attached to said body and closing the open side of the other of said cavities; a thermally responsive power element supported on said plate and including a movable part extending through an opening in said wall and engaging said first contact arm for moving said first contact arm from said first contact in response to a change in temperature; a rotatable adjusting member on said cover plate for positioning said power element relative to said first contact arm; means forming an opening between said cavities; a plunger in the last mentioned opening and extending from said one cavity to said other cavity and adapted to be guided longitudinally in said opening to one position for moving said third contact arm from said third contact member and to a second position for moving said fourth contact arm from said fourth contact; an operating lever pivotally supported on said cover plate and having the unpivoted portion engaging said plunger for controlling movement of said plunger to said first and second positions; a cam member attached to said rotatable member and adapted to be rotated thereby in a plane parallel to the plane of said cover plate and between said lever and cover plate, said cam member adapted to engage and shift said lever and thereby move said plunger to said first position thereof when said rotatable member is moved to a given angular position, said cam member including a surface adapted to engage and move said operating lever and plunger to said second position when said rotatable member is rotated to a second given angular position; a latch member pivoted to said transverse wall and having a portion extending into a slot in said cover plate; and means biasing said latch member in a direction to align a portion thereof for latching engagement with said movable end portion of said lever, and a portion of said cam member being adapted to engage and move said latch member in a direction opposite to said one direction and out of latching engagement with said lever.

2. A control apparatus as set forth in claim 1 further characterized by said rotatable adjusting member comprising a shaft-like portion extending from said plate into said other cavity, said cam member comprising a plate resting against said cover plate and having a noncircular opening closely receiving therethrough a correspondingly noncircular portion of said shaft whereby said shaft may move axially relative to said cam member, said lever having an end portion resting on said cam member, a spring urging said lever to said cam member and about the pivoted end of said lever to bias said lever in a direction to move said plunger to open said third and fourth switches and to urge said cam member to said cover plate.

3. A control apparatus comprising in combination, a body member having an open side and a cavity therein, switch means mounted in said cavity, a cover plate attached to said body and extending across said open side of said body, a temperature responsive power element attached to said cover plate and extending into said open side and including a movable member operative to actuate said switching means in said cavity, means to adjustably position said power means relative to said switching means including a rotatable part supported on said plate and extending into said open side, a switch means actuating member supported in said cavity at one side of said power element and movable between first and second positions for actuating said switching means, means biasing said member to one of said positions, a latch lever engageable with said actuating member for moving said member to said second position, a latch member in said cavity and having one end pivoted to said body and movable about its pivot to engage said actuating member when said actuating member is moved to a switch actuating position and to restrain movement of said actuating member towards said cover plate, and cam means in said cavity and movable with said rotatable part to shift said latch member to release said actuating member when said rotatable part is moved to a given angular position.

References Cited
UNITED STATES PATENTS

| | | | |
|---|---|---|---|
| 2,541,314 | 2/1951 | Weber et al. | 219—398 |
| 2,778,914 | 1/1957 | Vallorani | 219—398 X |
| 2,894,104 | 7/1959 | Weber | 219—509 X |
| 3,218,417 | 11/1965 | Mertler | 337—315 X |

BERNARD A. GILHEANY, Primary Examiner

H. B. GILSON, Assistant Examiner

U.S. Cl. X.R.

219—413; 337—325